United States Patent [19]
Muramatsu et al.

[11] Patent Number: 5,347,443
[45] Date of Patent: Sep. 13, 1994

[54] INVERTER APPARATUS AND A RESTARTING METHOD AT AN INSTANTANEOUS POWER FAILURE

[75] Inventors: Masaharu Muramatsu; Hiroshi Fujii, both of Chiba, Japan

[73] Assignee: Hitachi, Ltd., Tokyo, Japan

[21] Appl. No.: 34,883

[22] Filed: Mar. 19, 1993

[30] Foreign Application Priority Data

Mar. 19, 1992 [JP] Japan .................................. 4-063051

[51] Int. Cl.[5] .......................... H02M 3/24; H02P 1/26
[52] U.S. Cl. ....................................... 363/98; 318/778
[58] Field of Search ................... 363/34, 37, 39, 40, 363/76, 95, 98; 318/778, 805, 810, 811

[56] References Cited

U.S. PATENT DOCUMENTS

| | | | |
|---|---|---|---|
| 4,615,000 | 9/1986 | Fujii et al. | 363/98 |
| 4,642,474 | 2/1987 | Watanabe | 307/64 |
| 4,689,542 | 8/1987 | Ibori et al. | 318/778 |
| 5,177,678 | 1/1993 | Ibori et al. | 363/98 |

Primary Examiner—Steven L. Stephan
Assistant Examiner—Matthew Nguyen
Attorney, Agent, or Firm—Antonelli, Terry, Stout & Kraus

[57] ABSTRACT

An inverter apparatus and method having a restarting function at an instantaneous power failure includes a residual voltage detector for detecting a frequency and a phase of a residual voltage of an induction motor based on a direction of a current flowing in an induction motor connected to an output of the inverter apparatus by ON/OFF control of switching elements in an upper arm or a lower arm of an inverter portion simultaneously from a time after elapse of a predetermined period of time from occurrence of the power failure until a time of determination of restarting timing. A restart unit is provided for restarting the induction motor at the frequency and the phase detected by the residual voltage detector in determining the restart timing based on said residual voltage detector and the recovery timing of the power failure.

8 Claims, 5 Drawing Sheets

INVERTER APPARATUS AND A RESTARTING METHOD AT AN INSTANTANEOUS POWER FAILURE

BACKGROUND OF THE INVENTION

The present invention relates to an inverter apparatus, and in particular, to an inverter apparatus having a restarting function at an instantaneous power failure which is constituted so as to decrease the peak value of a restarting current as much as possible by applying a voltage conforming to a phase of a residual voltage of an induction motor (IM) connected to an output of the inverter apparatus at the recovery of the instantaneous power failure.

FIG. 1 shows a circuit diagram of an inverter apparatus having a conventional restarting function at an instantaneous power failure, including a converter portion for rectifying an AC power to a DC power; a smoothing capacitor 2 (CB) for smoothing a rectified DC power in the converter portion and an inverter portion 3 for converting DC power to an AC power having an arbitrary frequency. There is also provided a current detector 4 for detecting an output current of the inverter portion, an induction motor 5 connected to the output of the inverter apparatus, a phase detector 6, a power failure detector circuit 9 and an inverter control circuit 10. In the inverter apparatus, terminals R, S and T are connected to a power supply, and the AC power from the power supply is converted to an AC power having an output frequency corresponding to an instructed frequency, (not shown) and supplied to the induction motor 5 connected to the output thereof.

A conventional restarting operation at the occurrence of an instantaneous power failure in a power supply when the inverter apparatus of FIG. 1 is operating the induction motor at a variable speed will be explained in the following.

When a power failure occurs, after the lapse of a guaranteed period of time for the continuation of operation at an instantaneous power failure, base currents of transistors QR, QS, QT, QU, QV and QW, provided in the inverter portion 3 are cut off, and the motor runs in a free-running state. A secondary current which flows in a rotor of the induction motor 5 decreases according to an electric time constant, so that generally the residual magnetic flux remains for 0.1 to 1 sec. A residual voltage is generated in a primary side by the residual magnetic flux. The restarting of an operation at an instantaneous power failure means an operating method for restarting an induction motor by re-applying a voltage thereto when the power is recovered while the residual voltage is still being generated. In this case, if the re-applied voltage is opposite in phase to the residual voltage, an over current flows and an over current trip can be operated. In a conventional case, the phase detector 6 is provided on the output side of the inverter apparatus for detecting the residual voltage of the induction motor, and the inverter is controlled to output a voltage in phase with the detected residual voltage.

A circuit using a transformer for voltage detection (PT) or a photo-coupler 7 (PHC) as shown in FIG. 2 has been used as the phase detector 6 in order to separate a high voltage portion in a main circuit from a low voltage portion in a control circuit. In a conventional system, a transformer for voltage detection, which is not generally used in an inverter apparatus for general usage, is utilized, and there has been a problem such that the transformer increases the price of the inverter apparatus or prevents miniaturizing of the inverter apparatus. In the case of the phase detector 6 using the photo-coupler 7 (PHC), it is necessary to limit a current which flows in the photo-coupler, PHC, to be about 15 mA, so that, assuming that an effective voltage in the high voltage portion is 220 V, a current limiting resistor 8 (RUV) requires a capacity of 3.3 W, 15 kΩ, and a resistor of about 10 W will be used in consideration of reliability and allowance for heat capacity. Because of this, the size of the resistor itself becomes large, and there has been a problem of difficulty in miniaturizing the inverter apparatus in consideration of heat radiation. There has been also a problem that reliability may be degraded by the increase in the number of parts of the inverter apparatus.

SUMMARY OF THE INVENTION

It is therefore an object of the present invention to provide an inverter apparatus of small size, low price and high reliability which overcomes the problems of the prior art.

It is another object of the present invention to provide an inverter apparatus of small size, low price and high reliability which eliminates a need for a circuit using a voltage detection transformer or a photo-coupler as a phase detector in an inverter apparatus having a restarting function at an instantaneous power failure.

In accordance with the present invention, an inverter apparatus is provided wherein, a signal is given which makes switching elements on the upper arm or the lower arm of the inverter portion to be simultaneously conductive at the occurrence of an instantaneous power failure at such intervals that when the signal is made OFF, a short-circuit current can be decreased to be zero. A current which flows is detected by a current detector and the direction of the detected current is determined for detecting the phase of a residual voltage. Thereby a voltage which is in phase with the residual voltage can be re-applied to the induction motor.

In the case of an instantaneous power failure, a conduction signal is given simultaneously to the switching elements on the upper arm or the lower arm of the inverter portion, so that the terminals of the induction motor are short-circuited by the upper arm or the lower arm. In this case, a current is made to flow in the short circuit by a residual voltage of the induction motor. When the conduction signal is made OFF, the current is decreased to be zero. The current which flows in this case is detected by a current detector, and the direction of the detected current is determined. The phase of the residual voltage is detected by the direction of the detected current, and a voltage which is in phase with the residual voltage is re-applied to the induction motor.

These and other objects, features, and advantages of the present invention will become more apparent from the following description when taken in conjunction with the accompanying drawings which show, for purposes of illustration only, several embodiments of the present invention.

DETAILED DESCRIPTION OF THE PREFERRED EMBODIMENT

Figure 1:
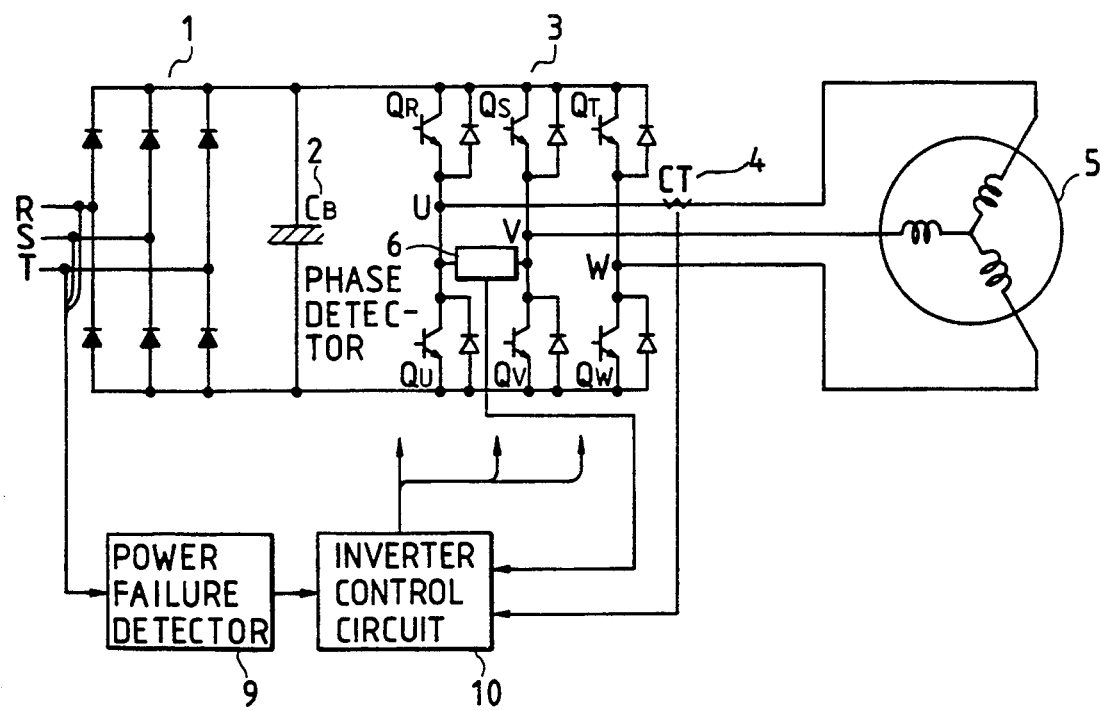
FIG. 1 is a block circuit diagram showing a conventional example of a restarting operation at an instantaneous power failure of an inventor apparatus.
Figure 2:
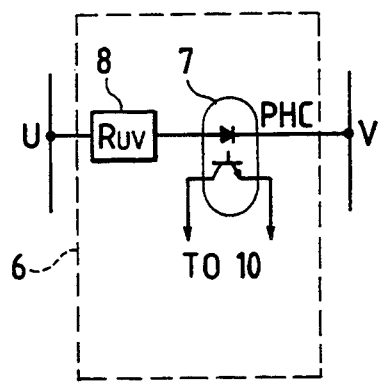
FIG. 2 is a schematic diagram of a conventional phase detector.
Figure 3:
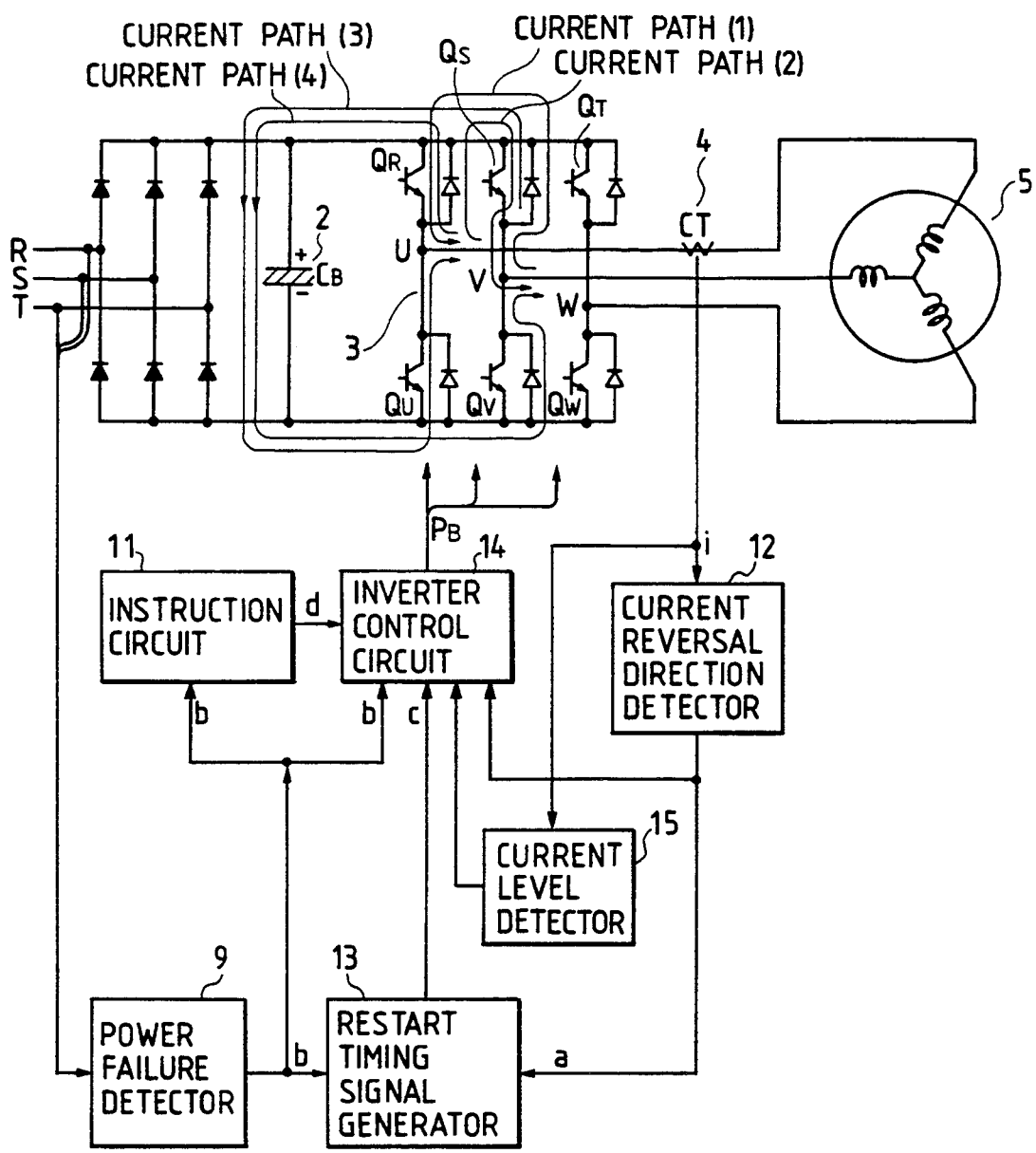
FIG. 3 is a block circuit diagram showing an embodiment of an inverter apparatus according to the present embodiment.

An embodiment according to the present invention is shown in FIG. 3 wherein like reference numerals are utilized to designate similar parts to those shown in FIG. 1. An instruction circuit 11 is provided for generating a simultaneous conduction control signal for instructing the switching elements on the upper arm or the lower arm of the inverter portion to be conductive simultaneously at specified intervals when a power failure is detected by the power failure detection circuit 9. A current direction reversal detection circuit 12 is provided for detecting the reversal of a current direction in accordance with an input signal from the current detector 4. A restarting timing signal generation circuit 13 is provided for detecting the timing for re-applying a voltage after the power supply is recovered. There is also provided an inverter control circuit 14 and a current level detection circuit 15. The circuits, 9, 11, 12, 13, 14 and 15 can be constituted with discrete circuits, but they can be constituted commonly with a circuit using a microcomputer.

Figure 4:
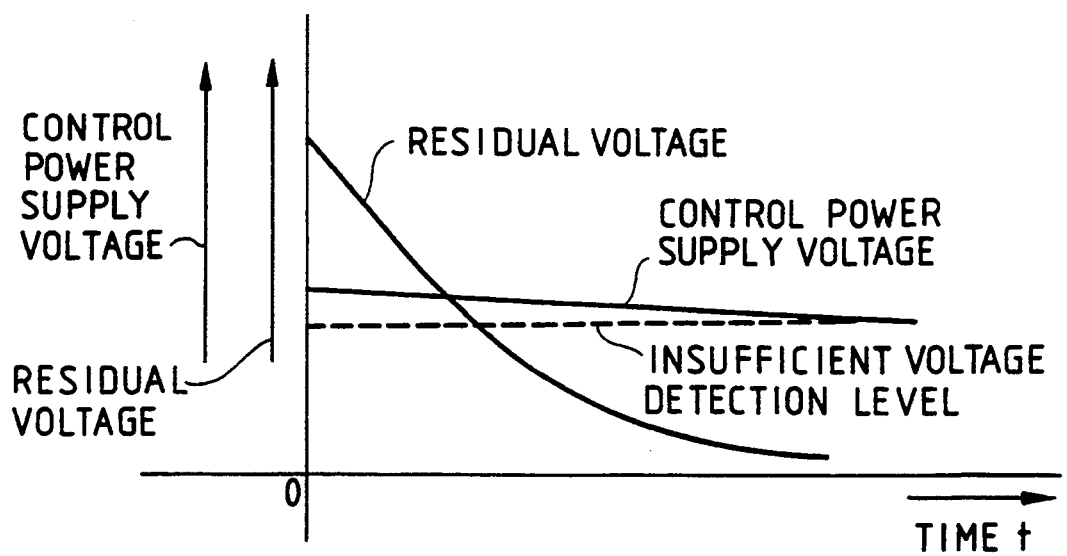
FIG. 4 is a graph showing curves of residual voltage characteristics of an induction motor at a time of a power failure, and voltage characteristics of a control power supply at the time.

In the inverter apparatus of FIG. 3, when an instantaneous power failure occurs, after the lapse of a guaranteed period of time for the continuation of operation at an instantaneous power failure, the output is cut off for self-protection. The residual voltage of the induction motor rapidly decreases with the lapse of time generally at a time constant of 0.1 to 1 sec as shown in FIG. 4 at the cutoff of the output, but since the control power is obtained from the terminals of the smoothing capacitor 2 (CB) by DC/DC conversion, etc., the control power supply voltage decreases gradually. The control circuit can be operated until the control power supply voltage goes below the insufficient voltage detection level. Therefore, even in an instantaneous power failure, it can control a control system in a period of time in the order of that until the residual voltage of the induction motor disappears.

Figure 5:
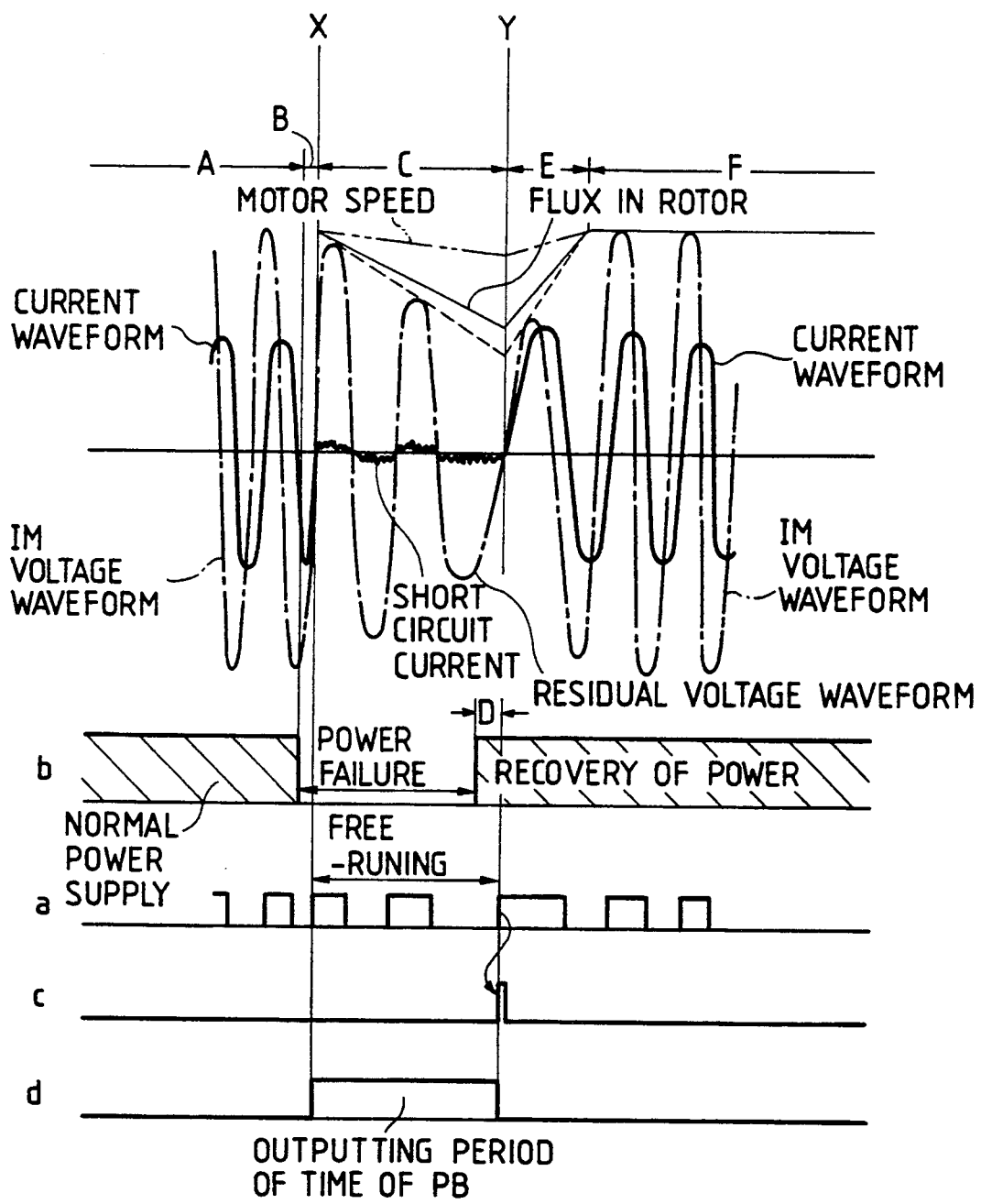
FIG. 5 shows waveforms for explaining the restarting operation of the embodiment according to the present invention at an instantaneous power failure.

FIG. 5 shows respective restarting operations at the recovery of an instantaneous power failure for the inverter apparatus of FIG. 3. In the area A, there is shown a behavior in a normal operation before the occurrence of an instantaneous power failure. In the area B, there is shown a guaranteed period of time for the continuation of operation at an instantaneous power failure. In the area C, there is shown a behavior in a period of time of free-running at the occurrence of an instantaneous power failure. In the area D, there is shown a preparation period of time for restarting after the recovery of power. In the area E, there is shown a behavior in an acceleration period of time in a restarting operation. In the area F, there is shown a behavior in a normal operation period of time after the completion of restarting operation.

After the lapse of the guaranteed period of time for the continuation of operation at an instantaneous power failure, the output is cut off, so that a residual voltage appears at a terminal from a time point X as shown in FIG. 5, and the residual voltage is attenuated with the lapse of time. In order to detect the residual voltage, in the present embodiment, base currents are made to flow simultaneously in the transistors QR, QS and QT on the upper arm of the inverter portion 3 of FIG. 3 during a period of time of free-running, and the phase of the residual voltage of the induction motor 5 can be determined from the direction of the current which flows in this case.

Figure 6:
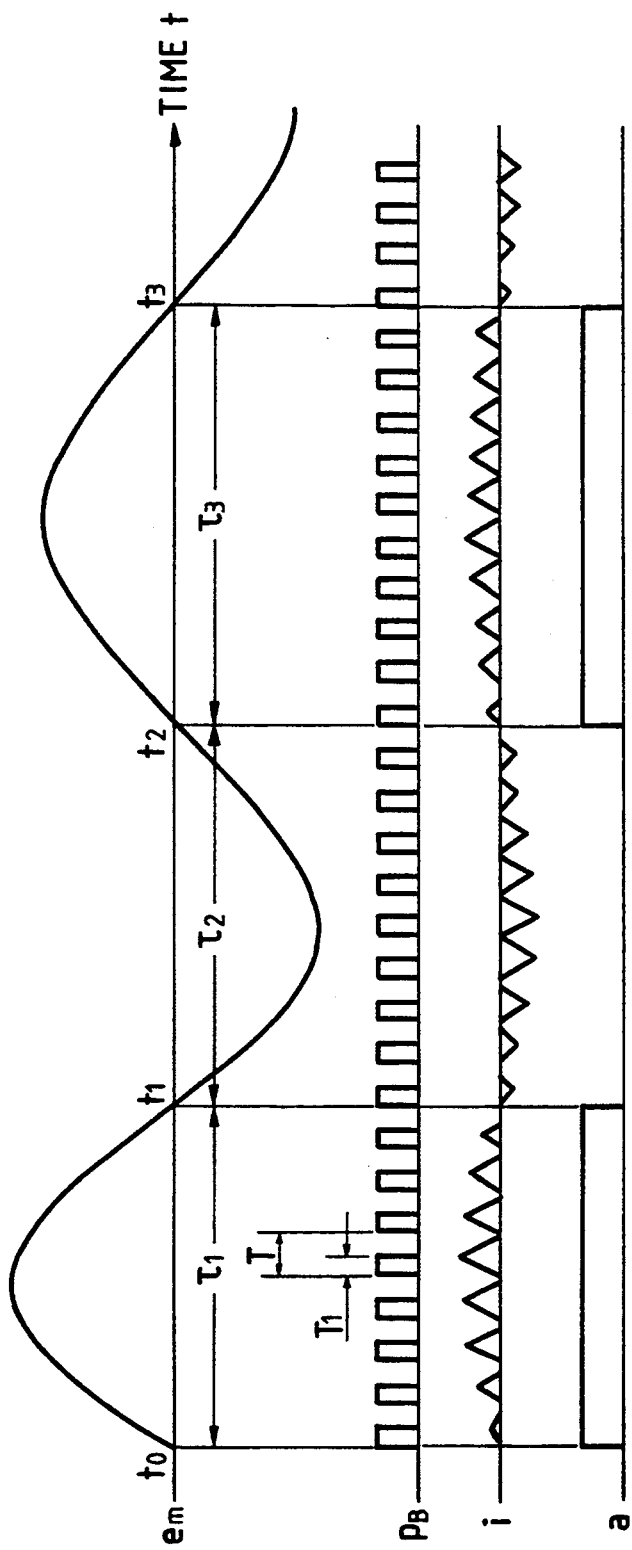
FIG. 6 shows waveforms for explaining the restarting operation of the embodiment according to the present invention at an instantaneous power failure.

The instruction circuit 11 for the generation of a simultaneous conduction control signal instructs the inverter control circuit 14 to supply a pulse base signal as shown by PB in FIG. 6 in a period of time in which PB is output which is shown as a signal d in FIG. 5 to the transistors QR, QS and QT simultaneously at specified intervals after the lapse of the guaranteed period of time for the continuation of operation at an instantaneous power failure from the time of detection of a power failure by the power failure detection circuit 9.

FIG. 6 shows the details of a residual voltage em of the induction motor, a base signal PB for the transistors QR, QS and QT, an output current i, and a detection signal a for detection of the direction reversal of an output current.

When a signal PB is applied simultaneously to the bases of the transistors QR, QS and QT of FIG. 3, a short circuit is formed which short-circuits the terminals of the induction motor 5 on the upper arm of the inverter. In this case, for example, when a phase U, and a phase V, are observed, short circuit currents flow through a current path (1) or a current path (2) as shown in FIG. 3. The selection of a current path, the path (1) or the path (2), is determined depending on the polarity of the residual voltage of an induction motor 5. In other words, if the potential of the terminal of the phase V is higher than that of the terminal of the phase U, the current path (1) is selected. Conversely, if the potential of the terminal of the phase U is higher than that of the terminal of the phase V, the current path (2) is selected. When the base signal for the transistors QR, QS and QT is turned OFF, the transistors QR, QS and QT are turned OFF, so that the short-circuit current in the current path (1) or the current path (2) is changed over to a current path (3) or a current path (4). In the current paths (3) and (4), the smoothing capacitor 2 is connected, and the current changed over to the current path (3) or the current path (4) is decreased with the decrease in the voltage of the smoothing capacitor 2.

If a period of time when the base signal is kept ON is expressed by T1 and the period of pulses is expressed by T, when T1/T is less than 0.5, the voltage of the smoothing capacitor 2 is larger than the residual voltage, so that the residual voltage certainly can be zero while the base signal is OFF. Therefore, when the current is detected by the current detector 4 (CT), a current waveform as shown by the current waveform i as shown in FIG. 6 can be obtained. As seen from the waveform, the flowing direction of the short-circuit current coincides with the polarity of the residual voltage expressed by em. The polarity of the residual voltage can be determined by detecting the direction of the current, and it can be determined that the direction reversal point of the current is the zero-cross point of the residual voltage. It is desirable to make the period T of the base signal PB as small as possible so as to make the deviation small in the detection of the zero-cross point of the residual voltage. When the period of the base signal PB is made small, however, the peak value of the short-circuit current i becomes low, which makes the current detection difficult so that the period of the base signal PB is determined considering the balance of the two factors.

The detection circuit 12 for detecting the reversal of the current direction, shown in FIG. 3, memorizes the current direction when a pulse PB is given and outputs a signal a as shown in FIG. 6. The circuit can be constituted with a sample-hold circuit. In this case, however, the sample-hold circuit is needed to hold only the polarity and is not needed to hold the magnitude. In a case of a control circuit using a micro-controller, a circuit which stores data in a digital form can be utilized. An output signal b of the power failure detection circuit 9 and the output of the detection circuit 12 for detecting the reversal of a current direction are input to the re-starting time signal generation circuit 13, and it outputs a signal to the inverter control circuit 14 in detecting a reversal timing of the output of the detection circuit 12 for detecting the reversal of a current direction (such as a timing point Y as shown in FIG. 5) after the detection of the recovery of power by the power failure detection circuit 9. The signal is shown in FIG. 5 as a signal c. The phase of a re-applying voltage is determined based on the signal c and an output signal of the detection circuit 12 for detecting the reversal of a current direction.

The number of revolutions of the induction motor can be determined by measuring the interval between two consecutive output reversal timing points of the inverter control circuit 14 in accordance with the following equation, where $$N = 1/(\tau n \cdot P) \quad (1)$$

where
  $\tau n$: period of reversal of current direction;
  P: number of pairs of poles.

The frequency of a voltage for re-starting, f0, can be determined in the equation as shown below, $$f0 = NP = 1/(2\tau n) \quad (2)$$

The voltage having the phase and the frequency obtained as shown in the above is applied to the induction motor.

During period of time D, the frequency is gradually in creased up to a normal operation frequency, fn. In doing so, when a voltage is re-applied, the inverter output voltage and the residual voltage are made in phase and a starting current can be decreased.

The restarting frequency, f0, can also be operated as shown below. The number of times of direction reversal of the short- circuit current in each sampling period is counted, and from the counted value the number of revolutions of the induction motor can be operated in equation (3), and f0 can be obtained from the equation (2), $$N = Pn/(P \cdot TS) \quad (3)$$

where
  Pn: number of times of direction reversal of the short-circuit current;
  TS: sampling period.

Figure 7:
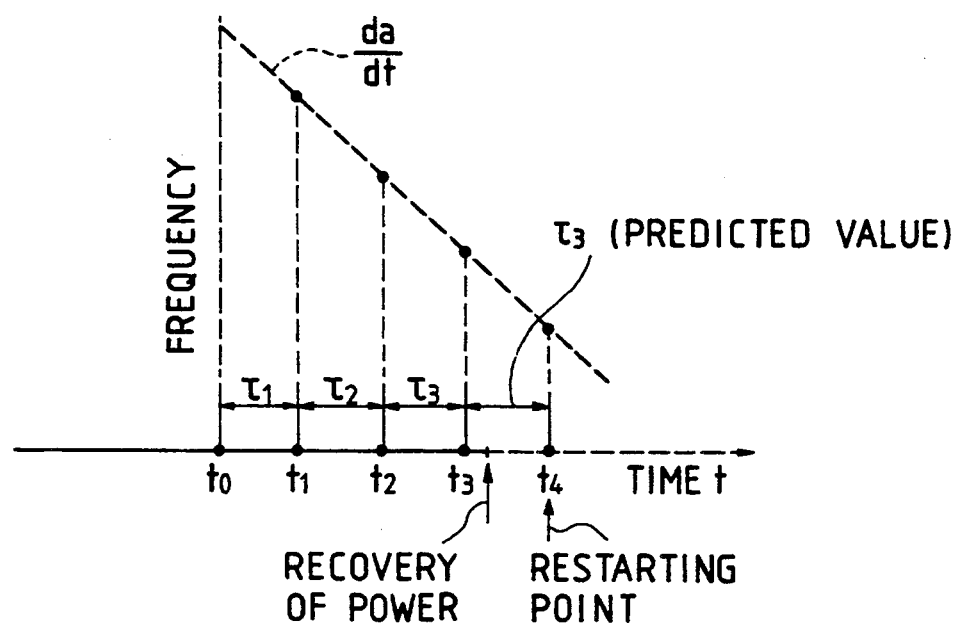
FIG. 7 shows frequency timing characteristics for determining a starting point for a restarting operation according to another embodiment of the present invention.

In the above embodiment, the change of the signal a, at the time point Y is detected, and immediately thereafter restarting is started, but the change of the signal a which represents a change of frequency of the motor during the free-running period is approximately a straight line in a short period of time as shown in FIG. 7, so that the next changing point can be estimated even though the change of the signal a at the time point therefore is not detected. In other words, as shown in FIG. 7, where the changes of frequency as represented by a change of signal a, i.e., da/dt is illustrated, if the power is recovered between t3 and t4, the next changing time t4 can be operated predictively by adding the time difference between the time t3, a time of 1 point earlier, and the time t2, a time of 2 points earlier. That is, $\tau 3$ is added to the changing point of time t3, a time of 1 point earlier. If the point of time t4 is made a starting point for restarting, similar operations can be executed.

When the present embodiment is applied to an inverter apparatus in which the number of revolutions decreases gradually, the zero cross point of the residual voltage can be detected with good precision.

When the residual voltage disappears, only an applied voltage is made to operate at the starting time, so that a normal starting method can be utilized. It is possible to switch to a normal starting method in determining if a predetermined period of time of disappearance of the residual voltage has passed. It is also possible to effect determination by the magnitude of a short-circuit current i. When a peak value of a short-circuit current as detected by the current detector 4 decreases to a level lower than a certain value, the residual voltage is regarded to have disappeared, and a signal is issued from the current level detector circuit 15 as shown in FIG. 3, and a starting method is switched to a normal one.

In the above explanation, a signal PB is provided so as to short-circuit an upper arm of an inverter portion, but the same operation can be executed by short-circuiting a lower arm. of the inverter portion. Further, it is arranged that the signal PB is supplied in a free-running period, but it is also possible to supply the signal after the recovery of the power. In this case, however, the timing of restarting is delayed by about one cycle of an output voltage.

In an inverter apparatus according to the present invention, the phase of a residual voltage can be detected using a current detector which is available in the market and there is no need to use a conventional phase detector. Thereby, it is possible to provide an inverter apparatus with a lesser number of parts and which is small sized, low in cost, and still of high reliability.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:
1. An inverter apparatus comprising:

residual voltage detection means for detecting a frequency and a phase of a residual voltage of an induction motor based on a direction of a current flowing in an induction motor connected to an output of the inverter apparatus by ON/OFF control of switching elements in one of an upper arm and lower arm of an inverter portion simultaneously from a time after elapse of a predetermined period of time from occurrence of a power failure until a time of determination of restarting timing; and restart means for restarting said induction motor at the frequency and the phase detected by said residual voltage detection means in determining the restart timing based on said residual voltage detection means and the recovery timing of said power failure.

2. An inverter apparatus according to claim 1, wherein said residual voltage detection means ON/OFF controls said switching elements on one of the upper arm and the lower arm of the inverter portion simultaneously with a pulse signal of a predetermined duty ratio from a time after the elapse of the predetermined period of time from the occurrence of power failure until the time of determination of restart timing.

3. An inverter apparatus according to claim 2, wherein said predetermined duty ratio is lower than 50%.

4. An inverter apparatus according to claim 1, wherein said restart means includes means for determining the restart time by predictive operation from the current direction reversal timing earlier by at least 2 points of timing than the recovery timing of said power failure.

5. An inverter apparatus according to claim 1, further comprising means for simultaneously controlling all switching elements in one of the upper arm and the lower arm of the inverter portion to be one of ON and OFF from the time after elapse of the predetermined period of time from occurrence of the power failure until the time of determination of restarting timing.

6. An inverter apparatus comprising:
a converter for converting AC power to DC power;
a smoothing capacitor for smoothing said DC power, said smoothing capacitor being connected to an output of said converter;
an inverter connected to said converter and having switching elements and diodes for supplying AC power having a frequency obtained in converting said DC power to an induction motor connected at an output thereof;
current detection means for detecting an output current of said inverter;
power failure detection means for detecting a power failure of an input AC voltage of said converter;
simultaneous ON/OFF control means for making switching elements on one of an upper arm and lower arm of said inverter operate ON/OFF simultaneously based on the output of said power failure detection means during free running of said induction motor;
current direction detection means for detecting a direction of an output current of said inverter based on the output of said current detection means;
frequency detection means for detecting a frequency of a residual voltage of said induction motor during the operation of said simultaneous ON/OFF control means based on said current direction detection means;
restart timing signal generation means for outputting a restart instruction based on the output of said power failure detection means and the output of said current direction detection means;
phase detection means for detecting a phase of a residual voltage based on the restart instruction and the output of said current direction detection means; and
means for restarting said induction motor with an AC power having a frequency and phase based on the output of said frequency detection means and the output of said phase detection means.

7. A restarting method for an inverter apparatus at an instantaneous power failure comprising:
a first step of executing ON/OFF control of switching elements of one of an upper arm and lower arm of an inverter of the inverter apparatus simultaneously from a time after elapse of a predetermined period of time from the occurrence of a power failure;
a second step of detecting a frequency of a residual voltage of an induction motor connected to an output of the inverter apparatus during the first step;
a third step of detecting a reversal of direction of an output current after the recovery of the power failure;
a fourth step of suspending the first step at a time of detection of the reversal of the direction of the output current in the third step; and
a fifth step, at the suspension of the first step, of restarting the induction motor by applying a voltage having a frequency, phase and voltage value corresponding to the frequency detected in the second step and the direction of the output current detected in the third step to the induction motor.

8. A restarting method of an inverter apparatus at an instantaneous power failure according to claim 7, wherein the direction reversal timing of the output current in the third step is detected by a predictive operation from the current direction reversal timing earlier by at least 2 points of timing than the recovery timing of the power failure.

* * * * *